C. A. HOEHN.
SEAT STRUCTURE.
APPLICATION FILED JUNE 28, 1919.
1,343,916.
Patented June 22, 1920.
2 SHEETS—SHEET 1.
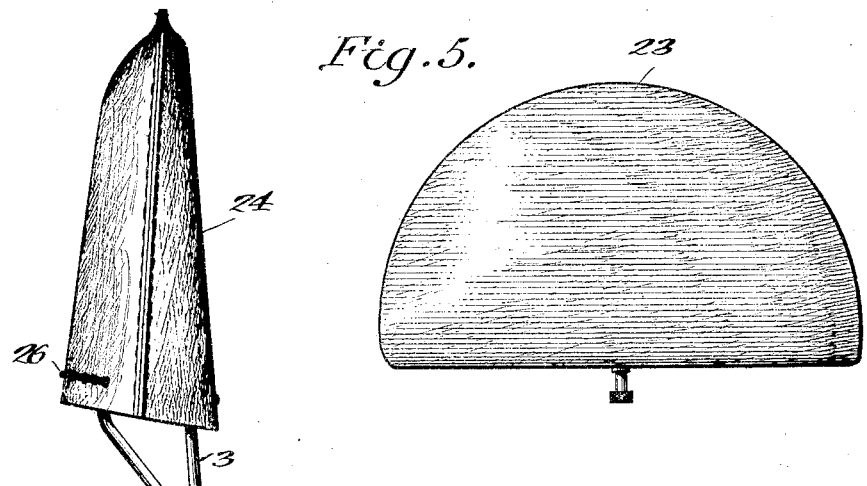
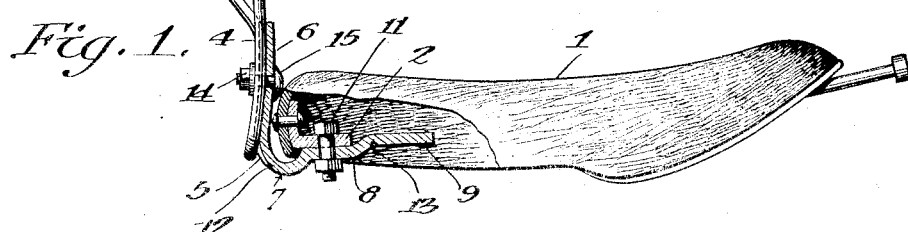
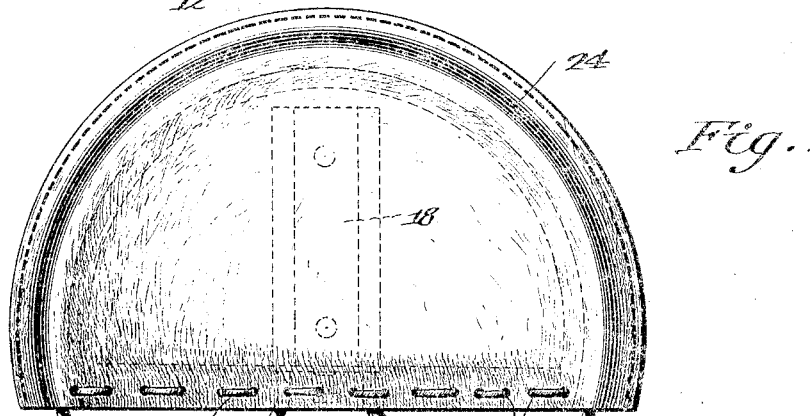
C. A. Hoehn,
Inventor.

C. A. HOEHN.
SEAT STRUCTURE.
APPLICATION FILED JUNE 28, 1919.
1,343,916.
Patented June 22, 1920.
2 SHEETS—SHEET 2.
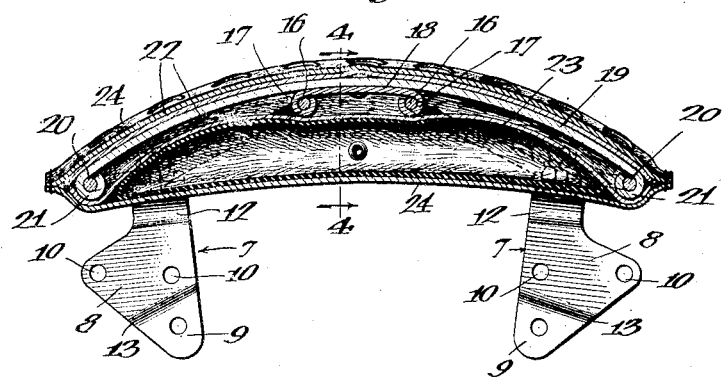
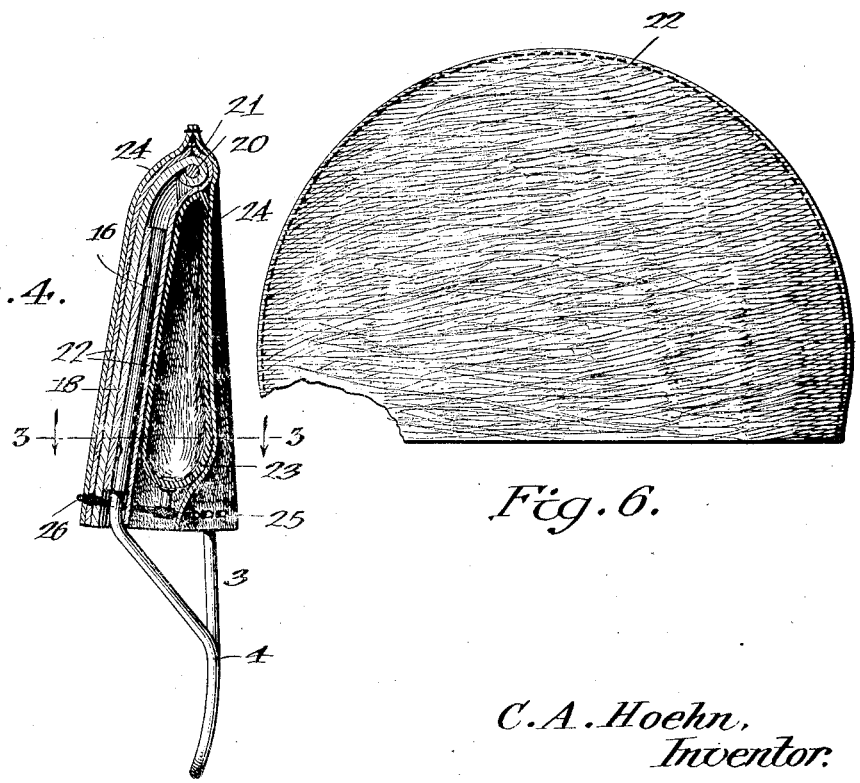
C. A. Hoehn,
Inventor.

UNITED STATES PATENT OFFICE.

CHARLES A. HOEHN, OF PITTSBURGH, PENNSYLVANIA.

SEAT STRUCTURE.

1,343,916.   Specification of Letters Patent.   Patented June 22, 1920.

Application filed June 28, 1919. Serial No. 307,267.

*To all whom it may concern:*

Be it known that I, CHARLES A. HOEHN, a citizen of the United States, residing at Pittsburgh, in the county of Allegheny and State of Pennsylvania, have invented certain new and useful Improvements in Seat Structures, of which the following is a specification, reference being had therein to the accompanying drawings.

This invention relates to a seat structure for preferably motor vehicles, or the like, and the object of the invention is the construction of a back of a seat which can be adjusted to a nicety to accommodate a rider, and which back will be easy upon the rider by reason of its peculiar and relatively simple construction.

Another object of the invention is the construction of a back for a seat which is durable, and efficient in operation, and which will give great comfort to the rider.

A still further object of the invention is the improvement of the construction of a motor cycle seat back as disclosed in my prior Patent #1,205,541, issued November 21, 1916.

With these and other objects in view, my invention comprises certain novel constructions, combinations, and arrangements of parts as will be hereinafter specifically described, illustrated in the accompanying drawings, and more particularly pointed out in the appended claims.

In the drawings,

Figure 1 is a view in side elevation of a seat and back constructed in accordance with the present invention, partly shown in section.

Fig. 2 is a front view of my improved seat.

Fig. 3 is a sectional view taken on line 3—3, Fig. 4, looking in the direction of the arrows.

Fig. 4 is a sectional view taken on line 4—4, Fig. 3, looking in the direction of the arrows.

Fig. 5 is a view in elevation of an air bag used in my seat back.

Fig. 6 is a plan view of the auxiliary cover of my improved back.

Referring to the drawings by numerals, 1 comprises the seat which is provided with the usual angular plate 2 in its rear, to which is attached the back 3.

The back 3 comprises a wire frame having legs 4, each of which legs is substantially U-shaped and fits between the flanged edges 5 (Fig. 1) of the vertical body 6 of the angle plates 7; there are two angle plates 7 used in the construction of my device, and as each is similarly constructed, it is only necessary to specifically describe one of these plates 7; each plate 7 is provided with a horizontal base that includes the flat central seat plate-engaging portion 8, and the motor cycle post or connecting outer aperture portion 9. In the seat plate-engaging portion 8 is formed a pair of apertures 10, through which the bolts 11 (Fig. 1) extend for fastening the angle plate 2 to the portion 8 of the angle plates 7. It is to be noted that the angle plates are downwardly curved at 12, permitting each plate to have a slight resiliency, although the wire structure of the frame of the back will give a considerable amount of resiliency to the entire back. The horizontal base of the angle plates 7 is bent upwardly at 13 so as to place the outer flat portion 9 higher up than the portion 8 so as to provide a better attaching lip or portion whereby the entire seat can be attached to the motor cycle.

Each leg 4 of the wire frame is curved or bowed inwardly, and the vertical body 6 of each angle plate 7 is curved likewise, so that by adjusting the legs vertically on the vertical bodies of the angle plates, the upper portion of the back can be brought inward or slightly inclined outwardly to the satisfaction of the rider on the seat 1, this movement being accomplished by merely loosening the nuts 14 on bolts 15, and then tightening the nuts after the back has been adjusted to the desired position, by sliding the legs up or down upon the vertical bodies 6. The outer prong of each leg 4 extends upward and constitutes a part of the outer prong of the other leg, for the legs of the wire frame are all in one piece, the wire frame having its inner ends 16 extending up near the middle of the back and fastened within the rolled edges 17 of the auxiliary plate 18, which auxiliary plate is fastened at the center of the central part of the primary plate 19, which primary plate 19 has the outer portion 20 (Fig. 3) of the wire frame rolled within its rolled edges 21, whereby the outer edges of the outer portion 20 of the wire frame, as well as the inner ends 16, are rigidly and securely fastened within metal cases constituted by the rolled positions of the primary and auxiliary plates.

An auxiliary bag or cover 22 is placed over the plates 18 and 19 to protect the air bag 23 from injury. Then over the air or pneumatic bag 23 is placed the primary cover or bag 24, which bag is preferably formed of leather, and is provided near its lower edges with eyelets 25 that receive lacing strings 26, whereby the outer bag or cover 24 can be tightly held or laced upon the wire frame and plates so as to securely hold the pneumatic or air bag 23 in position for affording an efficient cushion for the rider's back.

It is to be noted (Fig. 4) that the primary plate 19 overhangs, or is bent forwardly at its top so that the air bag fits into a pocket, by fitting under the top of the primary plate, between its vertical rolled edges, but not so far as to impair its efficiency as a cushion for the rider's or operator's back.

From the foregoing description, it will be understood that I have constructed an efficient, cushioned back and seat, and that the back is susceptible of being vertically adjusted for controlling the inclination of the back for better accommodating the seat back to the rider's back.

Certain minor changes or alterations may be found necessary in the construction of this device, when manufacturing the same on a large scale, and, therefore, I reserve the right to make such alterations or minor changes as shall appear to one skilled in the art to which this invention relates, which alterations or changes shall fairly fall within the scope of the appended claims.

What I claim is:

1. In a device of the class described, the combination of a plurality of angle plates, each angle plate provided with a curved vertical body, a vertically-slidable back secured against the rear face of said curved vertical bodies throughout their heights, and means for securing said back in an adjusted position upon said vertical bodies.

2. In a device of the class described, the combination of angle plates, each plate including a curved vertical body, a back provided with legs, said legs slidably engaging and resting against the curved vertical bodies throughout their heights and means for fastening said legs in adjusted positions upon said vertical bodies.

3. In a device of the class described, the combination with a support of angle plates rigidly fastened at their bottom to said support, each plate provided with a vertical body curved throughout its length, each body provided with rearwardly-extending flanged edges, a back provided with legs, said legs positioned between the flanges of and engaging the rear faces of the vertical bodies and resting against said bodies throughout their length, and detachable fastening means securing said legs in an adjusted position upon said bodies.

4. In a device of the class described, the combination with a support, of a back carried by said support, said back comprising a wire frame, a primary plate rolled at its edges upon the outer portion of said frame, an auxiliary plate secured to the central part of said primary plate, said auxiliary plate being rolled at its vertical edges over portions of said frame, said frame and primary plate being bent to form an air-bag-receiving pocket within the frame and primary plate, protecting means upon said frame and plates, an air bag resting against the outside of said protecting means, within said pocket formed by the frame and primary plate, and a cover over said air-bag protecting means, plate, and frame.

In testimony whereof I hereunto affix my signature.

CHARLES A. HOEHN.